June 16, 1925.  1,542,034

E. W. COMFORT ET AL

THERMOSTATIC REGULATOR

Filed June 11, 1923   2 Sheets-Sheet 1

Fig. 1.

Inventors.
Edward W. Comfort
Albert W. Thompson
by Heard Smith & Tennant
Attys.

June 16, 1925.  1,542,034
E. W. COMFORT ET AL
THERMOSTATIC REGULATOR
Filed June 11, 1923   2 Sheets-Sheet 2

Inventors.
Edward W. Comfort
Albert W. Thompson
by Heard Smith & Tennant.
Attys.

Patented June 16, 1925.

1,542,034

UNITED STATES PATENT OFFICE.

EDWARD W. COMFORT, OF WINCHESTER, AND ALBERT W. THOMPSON, OF LOWELL, MASSACHUSETTS, ASSIGNORS TO PARKS-CRAMER COMPANY, OF BOSTON, MASSACHUSETTS, A CORPORATION OF MASSACHUSETTS.

THERMOSTATIC REGULATOR.

Application filed June 11, 1923. Serial No. 644,556.

*To all whom it may concern:*

Be it known that we, EDWARD W. COMFORT and ALBERT W. THOMPSON, both citizens of the United States, residents of Winchester, county of Middlesex, State of Massachusetts, and of Lowell, county of Middlesex, State of Massachusetts, respectively, have invented an Improvement in Thermostatic Regulators, of which the following description, in connection with the accompanying drawing, is a specification, like characters on the drawing representing like parts.

This invention relates to improvements in thermostatic regulators of the type in which two thermosensitive members are subjected to different temperature conditions and the differential action of the unrestricted movement of said thermostatic members is utilized to control a source of energy, such as, means for controlling the amount of moisture supplied by a humidifying system to the air of an enclosure, or such other system as may be controlled by the differences in temperature to which the thermostatic members are subjected.

The energy-controlling devices forming part of regulators of this type usually are in the form of a small pneumatic valve which is actuated by the movements of the thermostatic elements and which in turn controls an intermediate force which is utilized to operate main valves of a compressed air line or water supply of a humidifying apparatus or alternatively the intermediate force comprises an electric circuit for operating said valves in which case the energy-controlling device is adapted to make and break an electric circuit by contact and is actuated by the movements of the thermostatic elements.

Since the invention involves no novel features as to the controlling device, the intermediate force or the devices operated thereby, all of which are well known in the art, no specific description of these devices is necessary.

The thermostatic members or elements heretofore used in the art comprise, first, mercury thermometers used to operate an electric system which includes a net work of wires, resistances, etc., and requires great skill and delicacy in construction. Second, thermostatic members or bars which operate by linear expansion and the movements of which are microscopic and involve the use of extremely delicate and sensitive mechanical or electrical apparatus. Third, thermostatic members consisting of bellows or tubes filled with expansible fluid or vapor which produce greater movements in response to changes in temperatures, but which are extremely expensive in construction and are not always homogeneous or uniform in their characteristics. Regulators of the first type are exemplified by the patents to Cramer Nos. 811,383, January 30, 1906; 813,083, February 20, 1906; and 856,-944, June 11, 1907. Those of the second or bar type are exemplified by the patents to Carrier Nos. 896,690, August 18, 1908; 902,713, November 3, 1908; 1,138,082, May 4, 1915; Carrier & Comfort Reissue 13,947, July 20, 1915; the patents to Comfort Nos. 1,040,625, October 8, 1912; 1,032,189, July 9, 1912; 1,122,077, December 22, 1914; and the patent to Thompson & Comfort 1,228,-718, June 5, 1917. Those of the third type having thermostatic members of the fluid or vapor expansion type are exemplified by patents to Cramer & Hodge Nos. 1,329,112, January 27, 1920; 1,331,981, February 24, 1920, (the latter of which also discloses as an alternative construction the expansible bar type).

In all of these instruments means are provided for producing an initial wet bulb depression setting by means of which the instrument may be adjusted to actuate the energy-controlling device upon variations from a predetermined wet bulb depression at any desired dry bulb temperature. Nearly all of these instruments are also provided with means for producing a "ratio adjustment" by means of which the instrument may be caused to actuate the energy-controlling device upon the basis of variable wet bulb depression for different dry bulb temperatures, so that the condition of humidity in the enclosure, which is supplied by the humidifying system, may conform to certain fixed humidity laws, such as, that of a constant relative humidity, cotton regain, etc. The purposes of these adjustments need not be further described as they are fully disclosed in the patents above cited and are well recognized in the art of humidification.

One of the principal objects of the present invention is to provide a differential regulator having homogeneous thermostatic elements which are capable of producing a wider range of movement in response to variations in temperature than those of the bar type and which are not of the delicate and expensive construction of the fluid expansion or mercury types.

A further object of the invention is to avoid delicate and complex adjusting devices, such as the Wheatstone bridge of the electrical type, the undesirable screw connections, and the lever systems, etc., of the bar and fluid expansion type, the use of materials of different coefficient of expansion, and other expedients particularly for producing the ratio adjustments which have heretofore characterized differential regulators of these types and have called for great mechanical skill and expense in construction.

Another object of the present invention is the adaptation, in a regulator of this type, of thermo-sensitive members of such a nature and so organized that their thermal reactions and effective motions will not only be of considerable magnitude, but that they may take place freely, unhampered by springs or other resistances and be transmitted directly to the controlling device without the interposition of levers or value-modifying mechanisms, the elements themselves being perfectly homogeneous in nature and unencumbered by screws or fixtures whose thermo-sensitive properties would affect or modify the thermal reactions of the elements themselves. The characteristics which are thus secured in the elements themselves and their mechanical organization with respect to the controlling device result in a construction of the utmost simplicity, operable with a minimum of frictional resistance and at the same time possessing every necessary qualification as to sensitiveness to temperature changes and adjustability, enabling the positive predetermination of any selected atmospheric condition.

The present invention may be defined more specifically as embodying the general principles of operation disclosed in the patents to Carrier 896,690 and 902,713 in which two concentrically arranged thermostatic elements are so organized that one element carries the other and the resultant or net difference in their linear expansions directly actuates the device for controlling the source of energy.

The principal features of novelty which characterize and distinguish the present invention from the devices disclosed in these Carrier patents lies in, first, the adoption of elements having like coefficient of expansion and which are capable of much greater movements than the thermostatic elements of the Carrier devices when subjected to different temperatures; second, the physical separation and convenient insulation of the thermostatic members to prevent the temperature, to which one of the members is subjected, from affecting the temperature to which the other member is subjected; third, the elimination of the non-positive screw connections and adjustments from the operative assembly, and, fourth, the employment of adjusting means of a simple and positive form which can be readily manipulated to produce the desired settings or adjustments.

In order to provide a thermostatic regulator of a type insensitive to vibration and in which the thermostatic elements will have a greater range of movement when subjected to variations in temperature than those heretofore produced, the present invention contemplates the use of a plurality, preferably two thermo-flexible members which, when subjected to changes in temperature, will react by a change in curvature throughout their length. In order to avoid the sensitiveness of such elements to sympathetic vibration to which they are subject when supported or fixed at one end only as has been hitherto common in the construction of commercial thermostats, we prefer to utilize the resulting lateral deflection of such an element as between its middle and a line connecting its ends, mounting the elements in such a manner and so disposed with respect to the energy-controlling device that the latter will be operated differentially by the respective lateral deflections of the thermostatic members.

Any suitable thermo-flexible member capable of lateral distortion or warping when subjected to variations in temperature may be employed. Preferably, however, bi-metallic thermostatic members are utilized comprising strips or ribbons composed of two plates of different metals having different coefficients of expansion, welded or otherwise secured together throughout their lengths. A very efficient thermo-flexible member of this character consists of a strip or ribbon formed of plates of invar metal and brass welded together throughout their lengths. This material is commercially available and is extremely uniform in its characteristics and of a durable quality and may be obtained at a relatively low cost. Such thermostatic elements possess the great advantage of producing relatively large movements of distortion resulting from relatively small changes in temperature. These elements preferably are substantially straight in their original condition of manufacture, neither of the component materials being under initial stress or strain. They have, therefore, a maximum sensitiveness in response to temperature changes.

These elements or thermostatic members are supported, as will hereinafter more fully appear, in such a manner as practically to secure immunity from vibration, which is an important consideration in factories in which such instruments are employed. Each element is separately but movably or adjustably secured upon a rigid base so positioned that the thermostatic elements or members may be conveniently insulated from each other to prevent the temperature, to which one is subjected, from affecting that to which the other is subjected. The energy-controlling device is fixedly supported upon the same base and is not connected with either element except when actuated by the differential action of the thermo-flexible members and each element is free to accommodate itself to the influence of changing temperature, unhampered by springs or resistances other than a negligible minimum of friction. Thus all operative spring connections between parts of the instrument and the use of compression springs are avoided. By reason of the present invention, therefore, a simple and effective differential thermostatic regulator is provided having numerous advantages over those of the prior art.

Other objects and features of the invention will more fully appear from the following description and the accompanying drawings and will be particularly pointed out in the claims.

The regulator illustrated in the accompanying drawings, as a preferred embodiment of the invention, comprises a base 1, which supports thermo-flexible members suitably insulated from each other and subjected respectively to the wet and dry bulb temperatures of the air and also serves to support the energy-controlling device which preferably is located between the thermo-flexible members. The thermo-flexible members are connected together by rods as will hereinafter more fully appear. The base and the rods connecting the thermo-flexible members are preferably made of materials having relatively negligible coefficients of expansion although they may be constructed of materials having considerable coefficients of expansion providing that the coefficients of expansion are substantially the same in both the base and the connecting rods. The object in either case is to avoid inaccuracies which might otherwise result from unequal expansion of these parts due to changes in temperature.

The base of the instrument illustrated is provided near its edge with a rib 2 which serves as a seat for the edges of the sides 3 of the cover 4 which desirably is of hollow, rectangular form. The rib 2 is provided adjacent its corner angles with dowel pins 5 which engage suitable sockets in the cover to hold the same in place and the cover is secured upon the base in any suitable manner as by screws passing through flanges in the cover and seated in suitable screw holes 6 in bosses and projecting from the rib 2.

Suitable partitions are provided to divide the interior of the casing into a dry bulb chamber, a wet bulb chamber and an intermediate chamber in which the energy-controlling device is located. As illustrated these partitions comprise plates 7 and 8, extending in parallelism with the sides of the base or casing, having respectively flanges 9 and 10 which rest upon the base and are secured thereto by suitable screws. A similar transverse plate 11, having a flange 12 secured to the base, connects the upper portions of the plates 7 and 8 to form a closed casing for the energy-controlling device, said plate 11 being located at a sufficient distance from the upper end of the casing to provide an air passage from the dry bulb compartment to the wet bulb compartment, so that a sample of air from the enclosure may be drawn upwardly through the dry bulb compartment to subject the dry bulb thermo-sensitive element to its temperature and thereafter saturated and caused to envelop the wet bulb thermo-sensitive member, so that the dry and wet bulb thermo-sensitive members are subjected respectively to the same current of air first in its normal and subsequently in its saturated condition at the wet bulb temperature thereof.

The principal object of the present invention is to provide a plurality, preferably two thermo-flexible members, which are subject respectively to different temperature conditions, such as the wet and dry bulb temperatures of the air, with means for so supporting said thermo-flexible members upon the base as to utilize the relative lateral movement between the middle and both ends of each of said members when subjected to variations in temperature and providing means differentially operable by the deflections of both of said members to actuate directly an energy-controlling device. In accomplishing this purpose in the present invention one of the thermo-flexible members is supported rigidly upon said base intermediate of its ends, preferably at its middle while the other thermo-flexible member is directly connected at its ends to the ends of the stationarily mounted thermo-flexible member, and is suspended from the base so that deflection of the stationarily mounted thermo-flexible member imparts a bodily movement to the suspended thermo-flexible member.

The energy-controlling device is actuated by the resultant deflection of the middle portion of the movable thermo-flexible member whose movement is derived in part from its own deflection and also in part from the bodily motion imparted to it by the deflection of the fixed thermo-flexible movement. The thermo-flexible members must be so disposed with respect to each other and the controlling device that this conjoint motion which actuates the controlling device will be differential and not additive. In the construction illustrated the positional relation of the thermo-flexible members and the controlling device is such that the actuating effect of one of the members is opposite in nature from the actuating effect of the other when they are both subjected to like changes in temperature. In other words, one of the elements has a positive actuating effect; the other has a negative actuating effect and the resultant actuating motion is the algebraic sum of the actuating motions of the respective thermo-flexible members.

It will readily be understood that either of the thermo-flexible members may be stationarily mounted and the other movable thereby. In the present embodiment of the invention the dry bulb thermostatic member is shown as stationarily mounted and the wet bulb thermostatic member bodily movable by the deflection of the former. Preferably each thermo-flexible member is formed of sheets of invar steel and brass welded together. As invar steel has a very low coefficient of expansion, while brass has a high cofficient of expansion, a thermostatic member is provided which is exceedingly sensitive to variations in temperature and will react by flexure to an appreciable extent when subjected to slight changes in temperature.

Any suitable means may be provided for rigidly supporting one of these members intermediate of its ends upon the base. As illustrated herein the dry bulb thermo-flexible member 13 is fixedly secured to a post or standard 14 which is integral with or secured to a plate 15 which is slidably mounted in ways 16 and 17 upon a flat plate 18 attached to the base. The plate has affixed to it a bracket 19 which extends in parallelism with the post 14 and is engaged by the screw threaded end portion 20 of an adjusting screw which is rotatably mounted in a post 21 extending from the base and is provided with a milled head 22 by means of which the screw may be rotated to adjustably position the plate and standard which support the dry bulb thermostatic member. A helical compression spring 23 desirably is interposed between the post 21 and bracket 19 to prevent any possible lost motion of the screw and insure an accurate setting for the dry bulb member.

Figure 1:
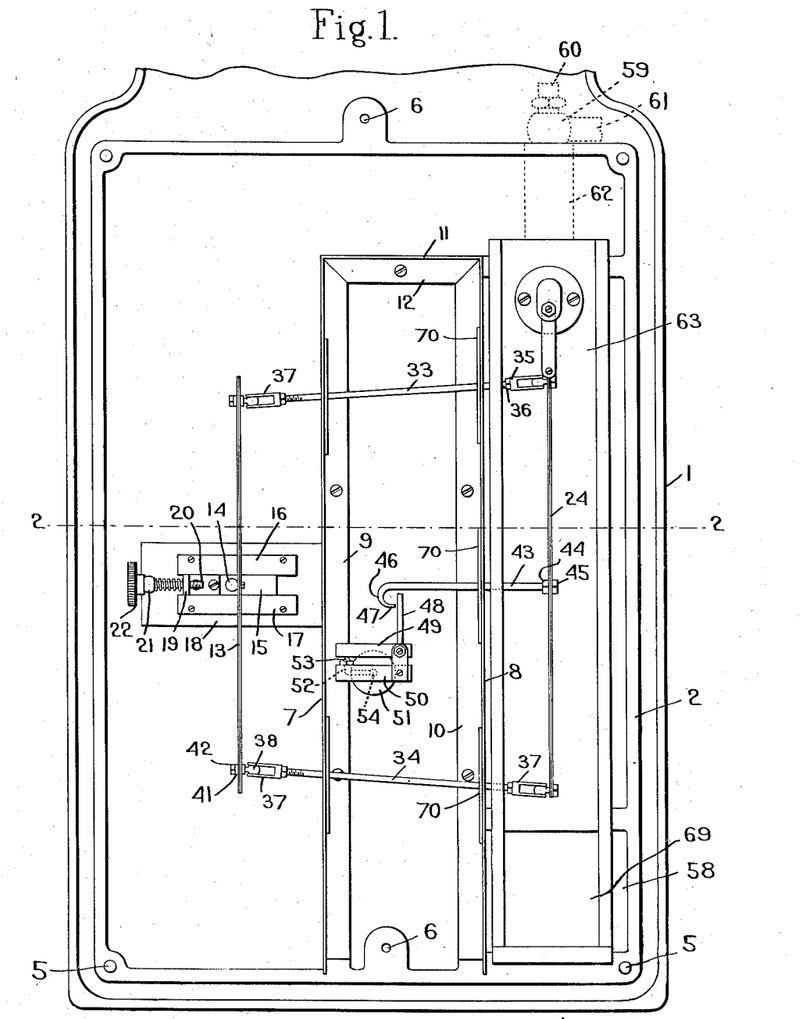
Fig. 1 is a front elevation of a preferred form of regulator embodying the invention, the cover being removed and the upper portion of the casing broken away.
Figure 2:
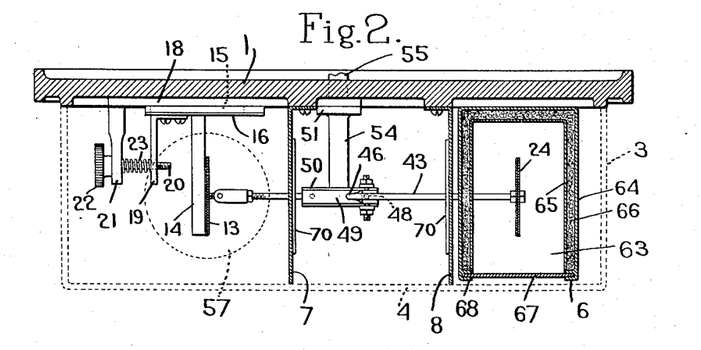
Fig. 2 is a transverse sectional view on line 2—2 Fig. 1, showing the cover in dotted lines.
Figure 3:
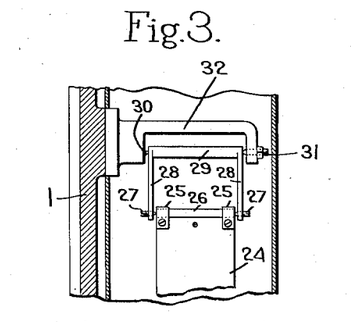
Fig. 3 is a detail view showing the preferred means for suspending one of the thermo-flexible members.

The wet bulb thermo-flexible member 24, which has the same resultant coefficient of expansion as the dry bulb thermostatic member, is provided at its upper end with turned-over extensions forming straps 25 which embrace a rod 26 the ends of which are provided with conical depressions to receive the conical ends of pivotal screws 27 which are seated in the lower ends of arms 28 of a yoke member 29, the connecting portion of which is provided with sockets engaged by conical pivots 30 and 31 upon a U-shaped post or standard 32 which is fixedly secured to the base 1. It will be understood, however, that any other equivalent means may be provided for suspending or guidably supporting the wet bulb thermostatic member so that it may have a free lateral bodily movement transmitted to it by the deflection of the stationarily secured thermo-flexible member.

Any suitable means may be provided for transmitting the deflection of the end portion of the stationarily supported member to the suspended member. In the preferred construction illustrated herein rigid rods 33 and 34 are employed to connect the respective ends of the wet and dry bulb thermostatic members together and in order to avoid both torsional and transverse strains the rods are connected to the respective members by flexible, preferably universal joints of any suitable type.

Figure 5:
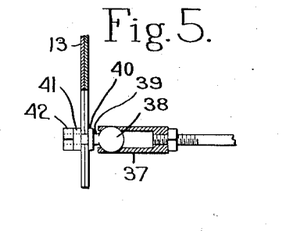

As illustrated herein similar flexible connections are employed for the ends of the rods, these connections being in the form of yoke-shaped blocks the bases 35 of which are provided with screw threaded apertures to receive the screw threaded ends of the rods. Check nuts 36 upon the screw threaded portions of the rods abutting against the bases 35 provide means for securing the yoke-shaped blocks rigidly in position, while the screw threaded connection between the yoke-shaped blocks and the rods permits them to be adjusted to vary the effective lengths of the rods. While this adjustment is convenient for initially positioning the thermo-flexible members in parallelism when originally assembling them in their normal position, it may be utilized to provide an effective initial depression adjustment if desired. It may be mentioned that in the latter case the post or standard 14, which rigidly supports one of the thermo-flexible members, may be fixedly, instead of adjustably, secured to the base.

The arms 37 of the yoke-shaped blocks are provided with apertures preferably having spherical walls to engage spherical heads 38 of bolts 39 which pass through the end portions of the thermo-flexible members. The bolts 39 are provided with bosses or shoulders 40 to engage one face of the thermo-flexible members and with clamping nuts 41, which engage the other faces of the thermo-flexible members, suitable lock nuts 42 being provided to rigidly retain the clamping nuts in position. It will be readily understood that by reason of this connection any flexure of the stationarily mounted member, due to changes in its temperature, will cause its ends to be deflected laterally relatively to its fixed central portion and will transmit such deflection through the rods 33 and 34 and thereby bodily move the freely suspended thermo-flexible member laterally in an amount equal to such deflection.

Inasmuch as the thermo-flexible member 24 is thus freely suspended and connected at its ends to the stationarily mounted thermo-flexible member, any deflection of the suspended thermo-flexible member will cause its middle portion to move laterally relatively to its ends. The central portion of the suspended thermo-flexible member 24 therefore has a conjoint motion, one component of which is the bodily movement derived by the member 24 from the deflection of the fixedly-mounted member 13 which results from the thermal reaction of the member 13; the other component being the deflection of the middle portion of the movably-mounted member 24 with respect to its own ends which results from its own thermal reactions. The two thermo-flexible members in the preferred illustration are disposed on opposite sides of the energy-controlling device, and in each member the expansible brass strip is on the same side with reference to the non-expansible invar steel strip as in the other member. A rise in temperature of one member therefore tends to cause actuation of the energy-controlling device while a rise in temperature of the other has the opposite tendency. Or in other words, the action of one member is positive and that of the other is negative with respect to the controlling device.

A simple and convenient device for thus utilizing the differential deflections of the thermostatic members, which is illustrated herein, comprises a rigid rod 43 which is secured preferably to the central portion of the suspended thermo-flexible member 24. As illustrated herein the rod 43 is provided with a screw threaded end which passes through a suitable aperture in the member 24 and is anchored by nuts 44 and 45 which engage opposite faces of the member 24. The end of the rod 43 desirably is bent downwardly to provide a hook-shaped portion 46, the end 47 of which is positioned to engage an upwardly-extending arm 48 upon a pivotally mounted contact member 49 of an energy-controlling mechanism which co-operates with a complementary stationary member 50 of the energy-controlling device.

The conjoint motion derived by the parts 43 and 46 from the two elements is, therefore, differential and not additive since the net resultant motion is the algebraic sum of the motion received from the positive element on the one hand and the motion received from the negative element on the other. The effective movement of the central portion of the suspended element 24 and parts 43 and 46 therefore results directly from the differential action of the deflections of the thermo-flexible members.

The energy-controlling device, which is illustrated herein, is of the well known pneumatic type in which a valve is operated to control a bleeding port of a diaphragm motor in a fluid pressure system, the diaphragm motor being utilized either as a relay to control other diaphragm motors which regulate the supply of moisture or heat to the enclosure whose condition of humidity or temperature is to be regulated, or which diaphragm motor acts directly to control the supply of humidity or heat to the enclosure. As this system is well known to those skilled in the art it need not be illustrated or described.

The contact member 50 as illustrated herein is in the form of a bar or head attached to a post 51 which is rigidly secured to the base 1. The head 51 is provided with a duct 52 terminating in a nozzle 53 having a port which is controleld by the movable contact member or valve 49. The duct 52 communicates with a conduit 54 which extends axially of the post and in turn communicates with a pipe 55 leading to a diaphragm motor which controls the source of fluid under pressure which actuates the mechanism for supplying moisture or heat to the enclosure.

Inasmuch as regulators of this type are so constructed as to provide either for regulation of pneumatic systems for controlling the supply of heat or moisture or for controlling electrical systems which regulate the supply of heat or moisture, it will be readily understood that electric contact members suitably insulated may be substituted for the pneumatic energy-controlling mechanism which is illustrated herein within the spirit of the present invention.

In assembling the device the thermo-flexible members are arranged to produce motion in parallelism with the end 47 of the rod 43 and so positioned with relation to the arm 48 of the pivotally mounted contact member or valve 49 that the latter will rest by gravity upon the nozzle or contact 53 of the complementary contact member. If the thermostatic members are of equal effective length and are exposed to equal variations in temperature, either increasing or decreasing, the end 47 of the bar 43 will not operatively engage the arm 48 of the contact member 49 since the resultant deflections of the thermostatic members will then be equal, but in opposite directions. If, however, the stationarily supported member is subjected to an increase of temperature greater than that of the bodily suspended member the deflection of the latter will be less than its bodily movement thereby causing the end 47 of the bar 43 to engage and actuate the stem 48 of the valve or contact member 49, thus actuating the energy-controlling device until the wet and dry bulb thermo-flexible members are subjected to the original differences in temperature. In the construction illustrated, the arm 48 is freely movable about its pivot away from the end 47 of the bar 43. This permits the movable contact member 49 to be swung away from the stationary contact member 53 so that the co-operating faces of the contact members may be readily cleaned. It also permits access to the nozzle 53 of the duct 52 where a pneumatic control is employed. This is very important as accumulation of dust or grit upon the face or faces of the co-operating contact members seriously interferes with their proper operation. By adjusting the support for the stationarily mounted member the end 47 of the bar 43 may be positioned more or less closely adjacent to the arm 48 of the movable contact member 49. Thus an initial depression adjustment of the instrument is provided which will enable the regulator to function upon variation from an initial predetermined difference in temperature between the thermo-flexible members.

As heretofore stated such an initial wet bulb depression may also be established by lengthening or shortening the rods 33 and 34 without moving the support for the stationarily mounted member.

Figure 4:
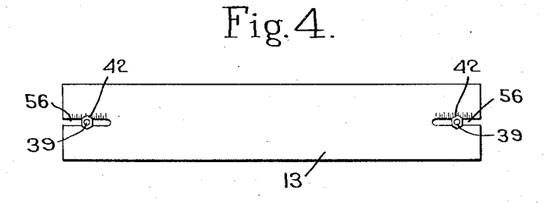
Fig. 4 is a detail view showing one of the flexible members and the means for producing the ratio adjustment of the instrument; and, Fig. 5 is a detail view, mainly in section, showing a preferred form of universal connection uniting the ends of the thermo-flexible members and also the means for producing the ratio adjustment.

Inasmuch as instruments of this character are ordinarily employed to regulate conditions of the atmosphere in which a variable wet bulb depression is required to conform to such laws of humidity as that of constant relative humidity, cotton regain, etc., ratio adjustment is required. This is accomplished in the present embodiment of the invention by providing means for varying the effective relative lengths of the wet and dry bulb thermo-flexible members. A simple and effective means which is illustrated herein consists in providing one of said members, preferably the stationarily supported member, with longitudinally extending slots 56 in which the bolts 39, which connect the thermostatic member to the rods 33 and 34, are adjustably secured as illustrated in Fig. 4. Inasmuch as the resultant coefficient of expansion of the thermo-flexible members is the same this adjustment of the relative lengths of the rods will provide for any desirable ratio adjustment.

In the construction illustrated means are provided to subject the thermostatic members to a continuous current of air from the room or enclosure whose moisture condition is to be regulated. An atomizer is utilized to induce the flow of an air current from the room into the casing near one of the elements which is thereby subjected to actual or dry bulb temperature of the air of the room. The atomizer is so located that the spray which it produces is mixed intimately and continuously with the air current as it enters the compartment containing the other thermostatic member. The mixture of air and spray is thereby lowered by evaporation to the psychrometric wet bulb temperature and envelops the other thermostatic member, thereby subjecting it to the true wet bulb temperature of the air of the room. Any other suitable means for exposing the members to the wet and dry bulb temperature, such as a moistened wick to envelop one member or a fan to induce a flow of air over the members, may be utilized.

In the construction shown air is admitted to the casing of the regulator through an aperture 57, preferably located in the lower portion of the cover, the air passing therefrom upwardly through the dry bulb chamber, thence across the upper end of the intermediate compartment above the partition 11, downwardly through the wet bulb compartment and out of the casing through an aperture 58 in the base of the casing. The air entering the wet bulb compartment of the casing is saturated by an atomizer 59 which is mounted upon the upper end of the casing and is supplied with compressed air and water respectively through the pipes 60 and 61. The spray from this atomizer passes downwardly through a conduit 62 in the upper portion of the casing into the wet bulb compartment. The spray thus introduced not only serves to saturate the air, but to induce the current of air upwardly through the dry bulb compartment and to deliver it through the aperture 58 at the lower end of the wet bulb compartment.

One of the features of the present invention consists in providing suitable means for preventing the temperature to which one of the thermostatic members is subjected from affecting the temperature of the other thermostatic member. By reason of the construction above described the rods 33 and 34 may be of any desirable length to position the thermostatic members remotely from each other and to permit the wet bulb thermostatic member to be enclosed in a suitable insulated conduit in an isolated position.

As illustrated herein the wet bulb thermostatic member 24 is enclosed in a conduit 63, preferably of rectangular form, and having outer and inner metallic walls 64 and 65 the space between which is filled with heat insulating material 66. As illustrated herein a glass plate 67, slidably mounted in ways 68 in the walls of the conduit, is provided to enable the operation of the wet bulb member to be observed, but if desirable the front wall of the conduit may be constructed in a manner similar to the other walls of the conduit.

The lower end of the conduit is provided with an aperture 69 which registers with the aperture 68 in the base. The conduit 63 when thus constructed may be supported free from contact with the base or with the walls of the partition which separates the wet bulb compartment from the remainder of the instrument. In order to prevent transference of heat by convection through the apertures in the partitions 7 and 8 through which the rods 33, 34 and 43 extend, members, preferably disks 70 of fibrous material such as felt, are secured to the partitions and provided with apertures the walls of which fit closely upon the rods 33, 34 and 43. The flexibility and the elasticity of these flexible disks 70 is such as to provide an effective seal without interfering with the freedom of movement of the rods 33, 34 and 43 caused by the deflections of the thermostatic members or the adjustability of the rods 33, 34 required to provide the ratio adjustment.

It will be noted that the wet and dry bulb compartments are located upon opposite sides of the intermediate compartment in which the energy-controlling device is mounted. Thus the wet and dry bulb compartments are remotely isolated by this intermediate compartment which is filled with air at the temperature of the room. By reason of the construction above described, therefore, a thermostatic regulator is produced comprising two thermostatic members subject respectively to the wet and dry bulb temperatures of the air which are so physically separated and insulated as to prevent the temperature to which one of said thermostatic members is subjected from affecting the other, while the connections between the thermostatic members are such that the thermo-expansion of one will impart bodily lateral movement to the other and the resultant deflection of both members be caused to control the source of energy. By adjusting the position of the thermostatic members relatively to the means for controlling the source of energy, any desired wet bulb depression may be established. Obviously the same result can be obtained by fixedly securing the support for the stationary supported thermostatic member and providing means for adjusting the means for controlling the source of energy relatively thereto. The desirable ratio adjustment of the instrument is accomplished by properly determining the relative effective lengths of the wet and dry bulb thermo-flexible members necessary to produce the desired result and adjusting the universal connections for the ends of the rods along the slots in the ends of the thermo-flexible member to correspond to the proper length of such element relatively to that of the other thermo-flexible member.

The thermostatic regulator above described is, therefore, of an exceedingly simple and relatively inexpensive construction. It comprises thermo-flexible members capable of producing much greater movement in response to variations in temperature than any of those of the bar type heretofore described and by reason of the uniformity of the resultant coefficient of expansion of the material of such members much more uniformity is obtained than in the fluid expansion type of regulators heretofore produced. The thermostatic members furthermore are adapted for more effective insulation against the influence of the temperatures affecting the respective members than other instruments of this type and the construction is such that stability of the instrument is obtained, and it is not susceptible to vibrations which will affect its accuracy.

It will be understood that the embodiment of the invention disclosed herein is illustrative and not restrictive and that various changes in materials, construction and arrangement of parts may be made within the spirit and scope of the following claims.

Having thus described the invention, what is claimed as new, and desired to be secured by Letters Patent, is:

1. A thermostatic regulator comprising a base, two thermo-flexible members subject respectively to different temperature conditions, means supporting the same upon said base to utilize relative lateral movement between the middle and the ends of each of said members when subjected to variations in temperature, an energy-controlling device fixed on said base and means operable by the differential action of the lateral deflections of both of said members to actuate said energy-controlling device.

2. A thermostatic regulator comprising a base, two thermo-flexible members subject respectively to different temperature conditions, means supporting the same upon said base to utilize relative lateral movement between the middle and the ends of each of said members when subjected to variations in temperature, an energy-controlling device fixed on said base, means operable by the differential action of the lateral deflections of both of said members to actuate said energy-controlling device and adjusting means for varying the initial relation between said members and said energy-controlling device.

3. A thermostatic regulator comprising a base, two thermo-flexible members subject respectively to different temperature conditions, means supporting the same upon said base to utilize relative lateral movement between the middle and the ends of each of said members when subjected to variations in temperature, an energy-controlling device fixed on said base, means operable by the differential action of the lateral deflections of both of said members to actuate said energy-controlling device and adjusting means operable to predetermine the relative actuating effects of said members upon said energy-controlling device.

4. A thermostatic regulator comprising a base, two thermo-flexible members, subject respectively to different temperature conditions, physically separated and insulated to prevent the temperature to which one of said members is subjected from affecting the other member, means fixedly connecting one of said members to said base, means supporting the other member to permit movement thereof, means connecting said members acting to transmit the deflection of one of said members to the other, an energy-controlling device fixed on said base and means operable by the differential action of the thermo-responsive movements of both members to actuate said energy-controlling device.

5. A thermostatic regulator comprising a base, thermo-flexible members, subject respectively to different temperature conditions, physically separated and insulated to prevent the temperature to which one of said members is subjected from affecting the other member, means fixedly connecting one of said members to said base, means supporting the other member to permit lateral bodily movement thereof, connecting instrumentalities flexibly joined to said members acting to cause the thermo-responsive movement of one of said members to move the other member bodily, an energy-controlling device carried by said base and means operable by the differential action of the thermo-responsive movements of both members to actuate said energy-controlling device.

6. A thermostatic regulator comprising a base, two thermostatic members, subject respectively to different temperature conditions, physically separated and insulated to prevent the temperature to which one of said members is subjected from affecting the other member, means rigidly connecting one of said members to said base, means supporting the other member to permit lateral bodily movement thereof, connecting instrumentalities flexibly joined to said members acting to cause the thermo-responsive movement of one of said members to move the other member bodily, an energy-controlling device carried by said base, means operable by the differential action of the thermo-responsive movements of both members to actuate said energy-controlling device and adjusting means for altering the positional relation of said thermostatic members and the energy-controlling device.

7. A thermostatic regulator comprising a base, two thermostatic members, subject respectively to different temperature conditions, physically separated and insulated to prevent the temperature to which one of said members is subjected from affecting the other member, means rigidly connecting one of said members to said base, means supporting the other member to permit lateral bodily movement thereof, means connecting said members acting to transmit the thermo-responsive movement of one of said members to the other, an energy-controlling device, means operable by the differential action of the thermo-responsive movements of both members to actuate said energy-controlling device and means for adjusting the value of the thermo-responsive movement of one of said members relatively to that of the other.

8. A thermostatic regulator comprising a base, two thermostatic members, subject respectively to different temperature conditions, physically separated and insulated to prevent the temperature to which one of said members is subjected from affecting the other member, means rigidly connecting one of said members to said base, means supporting the other member to permit lateral bodily movement thereof, connecting instrumentalities flexibly joined to said members acting to cause the thermo-responsive movement of one of said members to move the other member bodily, an energy-controlling device carried by said base, means operable by the differential action of the thermo-responsive movements of both members to actuate said energy-controlling device and means for adjusting said connecting instrumentalities to vary the effective length of one of said thermostatic members relatively to that of the other.

9. A thermostatic regulator comprising a base, thermo-flexible members, subject respectively to the wet and dry bulb temperatures of the air, one of which members is stationarily mounted intermediate of its ends upon said base and the other bodily movable by the deflection of said stationarily mounted member and an energy-controlling device operable by the differential action of the lateral deflections of both of said members.

10. A thermostatic regulator comprising a base, thermo-flexible members, subject respectively to the wet and dry bulb temperatures of the air, one of which members is stationarily mounted intermediate of its ends upon said base and the other bodily movable by the deflection of said stationarily mounted member, an energy-controlling device operable by the differential action of the lateral deflections of said members and means for adjusting the relative positions of said thermo-flexible members and said controlling device.

11. A thermostatic regulator comprising thermo-flexible members, subject respectively to the wet and dry bulb temperatures of the air, one of which members is stationarily mounted intermediate of its ends and the other bodily movable by the deflection of said stationarily mounted member and means connected to said movable thermo-flexible member operable by the differential action of the deflections of said members to actuate said energy-controlling device.

12. A thermostatic regulator comprising thermo-flexible members, subject respectively to the wet and dry bulb temperatures of the air, one of which members is stationarily mounted and the other bodily movable by the distortion of said stationarily mounted member, means connected to said movable thermo-flexible member operable by the differential action of the deflections of said members to actuate said energy-controlling device and means for varying the effective movement of said movable thermo-flexible member required to actuate said energy-controlling device.

13. A thermostatic regulator comprising a base, substantially parallel thermo-flexible members, subject respectively to the wet and dry bulb temperatures of the air, one of which members is stationarily mounted intermediate of its ends upon said base and the other of which is suspended upon said base to move freely laterally, means connecting the end portions of said members to cause said freely suspended member to be moved bodily by the deflection of said stationarily mounted member and means operable by the differential action of the deflections of said members to control a source of energy.

14. A thermostatic regulator comprising a base, substantially parallel thermo-flexible members, subject respectively to the wet and dry bulb temperatures of the air, one of which members is stationarily mounted intermediate of its ends and the other of which is freely suspended to move freely laterally, rigid members flexibly connecting respectively the upper and lower end portions of said thermostatic members to cause said freely suspended member to be moved bodily by the deflection of said stationarily supported member, an energy-controlling device having a stationary and a relatively movable contact member and means connected to the central portion of said movable thermostatic member operable by the differential action of said thermostatic members to actuate said movable contact member.

15. A thermostatic regulator comprising a base, a stand adjustably mounted upon said base, a dry bulb bi-metallic thermostatic member fixedly secured to said stand, a suspended wet bulb bi-metallic thermostatic member, rods connecting the respective end portions of said dry bulb thermostatic member to the end portions of said wet bulb thermostatic member, a stationarily supported energy-controlling device and means connected to the central portion of said wet bulb thermostatic member operable by the differential action of the deflections of said thermostatic members to actuate said energy-controlling device.

16. A thermostatic regulator comprising a base, a stand adjustably mounted upon said base, a dry bulb bi-metallic thermostatic member fixedly secured to said stand, a suspended wet bulb bi-metallic thermostatic member, rods connecting the respective end portions of said dry bulb thermostatic member to the end portions of said wet bulb thermostatic member, a stationarily supported energy-controlling device, means connected to the central portion of said wet bulb thermostatic member operable by the differential action of the deflections of said thermostatic members to actuate said energy-controlling device and means for adjusting the effective length of said dry bulb thermostatic member.

17. A thermostatic regulator comprising a base, a stand adjustably mounted upon said base, a dry bulb bi-metallic thermostatic member fixedly secured to said stand and provided with slots adjacent its ends extending longitudinally of said member, a suspended wet bulb bi-metallic thermostatic member, rods flexibly connected to said wet bulb member adjacent its ends and having bolts flexibly mounted upon their opposite ends passing through the slots in said dry bulb thermostatic member, means for securing said bolts in adjusted positions, a stationarily supported energy-controlling device and means operable by the differential action of the deflections of said thermostatic members to actuate said energy-controlling device.

18. A thermostatic regulator comprising a base, a stand mounted upon said base, a dry bulb bi-metallic thermostatic member fixedly mounted intermediate of its ends upon said stand, a suspended wet bulb thermostatic member, rods connecting the end portions of said dry and wet bulb thermostatic members having at their ends universal joints connecting them to the respective members, an energy-controlling device and means operable by the differential action of said thermostatic members to actuate said energy-controlling device.

19. A thermostatic regulator comprising a base having a guideway, a stand slidably mounted in said guideway, means for adjusting said stand, a dry bulb thermostatic member mounted intermediate of its ends on said stand, a suspended wet bulb bi-metallic thermostatic member, extensible rods connecting the respective end portions of said dry bulb thermostatic member to the end portions of said wet bulb thermostatic member, a stationarily supported energy-controlling device and means connected to the central portion of said wet bulb thermostatic member operable by the differential action of said thermostatic members to actuate said energy-controlling device.

20. A thermostatic regulator comprising a base having a guideway, a stand slidably mounted in said guideway, means for adjusting said stand, a dry bulb thermostatic member mounted on said stand, a suspended wet bulb bi-metallic thermostatic member, extensible rods connecting the respective end portions of said dry bulb thermostatic member to the end portions of said wet bulb thermostatic member, a stationarily supported energy-controlling device comprising a base member provided with an air valve port, a valve, pivotally mounted on said base member subject to the action of gravity, co-operating with said port, and provided with an upwardly extending arm and a rod fixedly secured to the central portion of said wet bulb thermostatic member having means positioned to engage said valve arm and operate the valve upon predetermined differential action of said theremostatic members.

21. A thermostatic regulator comprising thermo-expansive members subject respectively to the wet and dry bulb temperatures of the air, an energy-controlling device having a stationarily mounted contact member and a co-operating pivotally movable contact member normally resting by gravity upon said stationary contact member and capable of being swung about its pivot sufficiently to permit free access to the co-operating faces of both contact members and means movable relatively to said pivotally mounted contact member into and out of engagement therewith and operable by the difference in relative movement of said thermostatic members when subjected to predetermined differences in temperature effectively to separate said movable contact member from said stationary contact member.

22. A thermostatic regulator comprising a base, thermo-expansive members subject respectively to the wet and dry bulb temperatures of the air, a closed chamber intermediate of said thermo-expansive members, an energy-controlling device located within said closed chamber having a stationarily mounted contact member and a co-operating movable contact member normally engaging said stationary contact member and means movable by the difference in the expansive movements of said thermo-expansive members into and out of engagement with said movable contact member and operable when engaged therewith effectively to separate said movable contact member from said stationary contact member.

23. A thermostatic regulator comprising laterally distortional bi-metallic thermo-flexible members subject respectively to the dry and wet bulb temperatures of the air, an energy controlling device having a contact member and a co-operating pivotally mounted contact member normally resting by gravity upon said stationary contact member and freely movable relatively thereto and capable of being swung about its pivot sufficiently to permit free access to the co-operating faces of both contact members and means movable into and out of engagement with said movable contact member operable by the difference in the deflections of said thermo-flexible members when subjected to predetermined variations in temperatures to engage and effectively separate said movable contact member from said stationary contact member.

24. A thermostatic regulator comprising laterally distortional bi-metallic thermo-flexible members subject respectively to the dry and wet bulb temperatures of the air, an energy-controlling device having a contact member and a co-operating horizontal contact member pivotally mounted thereon normally resting by gravity upon said stationary contact member and provided with an upwardly extending arm which is freely movable to permit the movable contact member to be swung to substantially vertical position and means movable relatively to said arm operable by the difference in lateral deflections of said thermo-flexible members to engage said arm and swing said movable contact member out of operative engagement with said stationary contact member.

In testimony whereof, we have signed our names to this specification.

EDWARD W. COMFORT.
ALBERT W. THOMPSON.